United States Patent [19]

Weston et al.

[11] Patent Number: 4,722,832

[45] Date of Patent: Feb. 2, 1988

[54] SULFUR RECOVERY PROCESS

[75] Inventors: Charles W. Weston, Prairieville; John W. Wen, Baton Rouge, both of La.

[73] Assignee: Freeport-McMoRan Resource Partners, New Orleans, La.

[21] Appl. No.: 900,633

[22] Filed: Aug. 27, 1986

[51] Int. Cl.$^4$ .............................................. C01B 17/033
[52] U.S. Cl. ............................. 423/578 A; 423/178; 423/562; 423/563; 423/571; 423/573 R; 23/293 S; 299/5
[58] Field of Search ............ 423/562, 563, 565, 567 R, 423/567 A, 571, 573 R, 574 L, 575, 578 A, 178; 23/308 S; 299/5

[56] References Cited

U.S. PATENT DOCUMENTS

| | | | |
|---|---|---|---|
| 1,934,626 | 11/1933 | Nagelvoort | 423/562 |
| 2,177,707 | 10/1939 | Gaither | 423/574 L |
| 2,472,473 | 6/1949 | Fetterly | 423/573 |
| 2,722,473 | 11/1955 | Toland, Jr. | 423/573 |
| 2,934,414 | 4/1960 | Bradley, Jr. | 423/578 A |
| 3,535,089 | 10/1970 | Lewis et al. | 423/578 R |
| 3,578,418 | 5/1971 | Cantrell et al. | 23/299 |
| 3,619,147 | 11/1971 | Amano et al. | 23/308 S |
| 3,645,551 | 2/1972 | Thompson | 299/5 |
| 3,876,756 | 4/1975 | Romantschuk et al. | 423/562 |
| 3,957,503 | 5/1976 | Swanson | 423/562 |
| 4,147,611 | 4/1979 | Miasek et al. | 423/563 |
| 4,156,656 | 5/1979 | Dannenberg et al. | 423/565 |
| 4,210,526 | 7/1980 | Swanson | 423/562 |
| 4,483,827 | 11/1984 | Heimala | 423/178 |

Primary Examiner—Andrew H. Metz
Assistant Examiner—Anthony McFarlane
Attorney, Agent, or Firm—Richards, Harris, Medlock & Andrews

[57] ABSTRACT

A process for the recovery of sulfur from sulfur-bearing ores employing an aqueous leaching solution containing calcium monosulfide, calcium hydrosulfide or mixtures of such calcium sulfide species. The sulfur ore is contacted in an extraction zone with the aqueous leaching solution under conditions to solubilize sulfur from the ore in the form of calcium polysulfide. Preferably, the extraction step is carried out at an elevated temperature. The loaded leaching solution is recovered from the extraction zone and applied to a sulfur-production zone. Here the loaded solution is contacted with hydrogen sulfide under conditions to react the hydrogen sulfide with the calcium polysulfide to produce calcium hydrosulfide and elemental sulfur. The calcium hydrosulfide solution is recycled for use as leaching solution in the sulfur extraction zone.

28 Claims, 3 Drawing Figures

SULFUR RECOVERY PROCESS

TECHNICAL FIELD

This invention relates to the recovery of sulfur from sulfur bearing ores by solvent extraction and more particularly to sulfur recovery processes in which sulfur is solubilized in an aqueous leaching solution in the form of calcium polysulfide.

BACKGROUND ART

Elemental sulfur occurs naturally in deposits over salt domes, in volcanic deposits, and in evaporate basin deposits associated with calcite, gypsum and anhydrite. The oldest and still most widely used process for the recovery of sulfur from free sulfur containing ore bodies is the Frasch process. In this procedure, which is applied in the recovery of sulfur in situ from subterranean sulfur deposits such as those associated with salt domes in the gulf coast region of the United States, hot water under pressure is injected into the sulfur deposit at a temperature sufficient to melt the sulfur. The pressure maintained on the hot water injection process is sufficient to force the molten sulfur to the surface along with returning Frasch water.

For recovery of sulfur from surface or near surface deposits, or where the Frasch process is considered to be uneconomical because of its energy intensive nature or because the ore matrix is impervious to water, various other recovery procedures have been proposed. For example, sulfur recovery from surface or near surface deposits such as volcanic deposits, has been carried out employing distillation, autoclaving, flotation, agglomeration and solvent extraction. Distillation and autoclaving are, like the Frasch process, energy intensive. Flotation or agglomeration procedures usually yield a product which is not of sufficient purity to be used directly in most chemical process applications.

Many different types of solvent recovery processes have been proposed, both for the recovery of sulfur from crushed comminuted ores and for the recovery of sulfur from ores in situ. For example U.S. Pat. No. 3,535,089 to Lewis et al discloses the extraction of sulfur from a comminuted sulfur ore by means of a hydrocarbon solvent. Examples of suitable solvents disclosed in Lewis include cyclohexane, benzene, toluene and chlorinated hydrocarbons such as trichloroethylene, perchloroethylene, and trichloroethane. In the Lewis process, a solid alkaline material such as lime stone, trona, soda ash, borax, sodium carbonate, ammonium carbonate, ammonium bicarbonate or alkali metal oxide is mixed with the ground sulfur bearing ore. The mixture is then fed to a extraction zone which is operated in a continuous mode by moving the ore material through the zone by means of a helical conveyor.

Another sulfur extraction process using a solvent is based upon the extraction of sulfur by halogenated hydrocarbons as disclosed in U.S. Pat. No. 3,578,418 to Cantrell et al. In Cantrell the extraction solvent is a water immiscible chlorinated hydrocarbon such as trichloroethane, tetrachloroethane, and para- or ortho-dichlorobenzene. The extraction procedure is operated as a continuous type process in which hot loaded solvent is withdrawn from the extraction zone and then cooled to precipitate the sulfur in solid form. The sulfur is then washed with a wash liquid such as methanol, acetone or ethylene glycol.

Yet a further process which represents an improvement upon the process disclosed in the aforementioned patent to Lewis et al is disclosed in U.S. Pat. No. 3,619,147 to Amano et al. Here the solvent extraction and sulfur recovery steps are carried out in a closed system in which solvent is recycled without any loss through evaporation. The solvent extraction zone in Amano et al comprises a plurality of serially connected tanks which are operated to provide a multi-stage, semi-batch type operation.

Chemical extraction may be employed in the in situ recovery of sulfur from subterranean deposits of the type which are usually the subject of Frasch processing. For example U.S. Pat. No. 3,645,551 to Thompson discloses the recovery of sulfur employing an aromatic hydrocarbon which is injected into the deposit at an elevated temperature at which it reacts with sulfur to form hydrogen sulfide. The in situ reaction is carried out in the presence of sufficient water so that carbon dioxide is formed along with the hydrogen sulfide.

DISCLOSURE OF THE INVENTION

In accordance with the present invention there is provided a new and improved process for the recovery of sulfur from a free-sulfur containing ore through the use of a water-based sulfur solvent. In carrying out the invention, the sulfur ore is contacted in an extraction zone with an aqueous leaching solution containing at least one calcium sulfide species. A lixiviating relationship is established between the sulfur ore and the aqueous leaching solution under conditions to solubilize sulfur from the ore into the solution in the form of calcium polysulfide. The resulting leaching solution, which is now loaded with calcium polysulfied, is recovered from the extraction zone and passed to a sulfur production zone. Here the loaded solution is contacted with hydrogen sulfide under conditions to react the hydrogen sulfide with the calcium polysulfide in the loaded solution to produce elemental sulfur which precipitates from solution and calcium hydrosulfide which remains in solution. Temperature and/or pressure differentials between the extraction and production zones may be employed to establish the conditions for solubilization and production of sulfur. Preferably, a temperature differential is maintained between the two zones. Thus, the ore is contacted with the leaching solution in the extraction zone at a first relatively high temperature and the loaded solution is contacted with the hydrogen sulfide in the production zone at a second temperature which is lower than the first temperature. Preferably, the second temperature is at least 10° C. less than the first temperature.

In one embodiment of the invention, the aqueous solution of calcium hydrosulfide is withdrawn from the sulfur production zone and then heated in order to convert a substantial portion of the calcium hydrosulfide to calcium monosulfide. Hydrogen sulfide, which is a reaction product along with calcium monosulfide, is removed from the aqueous calcium monosulfide solution and recycled for use in the sulfur recovery zone. The remaining aqueous solution of calcium monosulfide is recycled to the extraction zone for the use in the leaching operation.

In another embodiment of the invention the aqueous solution of calcium hydrosulfide produced in the sulfur production zone is recycled directly to the extraction zone. The calcium hydrosulfide solution may be heated prior to passing it into the extraction zone or heating of the leaching solution along with the ore may take place in the extraction zone. In this embodiment of the invention the reaction between calcium hydrosulfide and free sulfur in the extraction zone results in the production of hydrogen sulfide along with the calcium polysulfide. The hydrogen sulfide is withdrawn from the extraction zone and preferably passed through a heat exchanger to the sulfur production zone.

DETAILED DESCRIPTION

Figure 1:
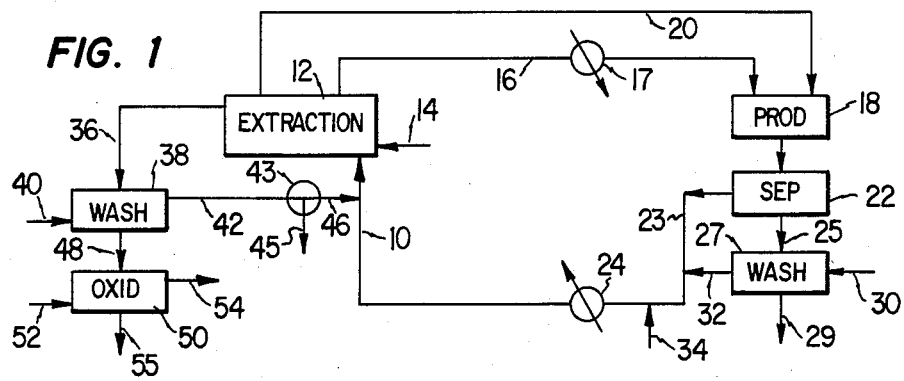
FIG. 1 is a schematic illustration of a flow diagram of one embodiment of the invention and FIG. 2 is a graph illustrating the relationship between temperature and pressure and sulfur content of the leaching solution.

The present invention provides a sulfur extraction process for the recovery of sulfur which employs an inexpensive and efficient water based sulfur solvent which can be used to recover sulfur from ores without excessive energy input. The solvent is a nonflammable material whose trace presence in waste byproducts can be conveniently transformed to a non-toxic residue.

The extraction solvent used as leaching agent in this invention is an aqueous solution of a calcium sulfide specie which reacts with the free sulfur to produce calcium polysulfide. Sulfur is extracted from a sulfur-bearing ore in accordance with one or both of the following reactions.

$$Ca(HS)_2 + xS \rightleftharpoons CaS_{(x+1)} + H_2S \qquad (1)$$

$$CaS + xS \rightleftharpoons CaS_{(x+1)} \qquad (2)$$

The calcium polysulfide ($CaS_x$) will take the form of a mixture of calcium pentasulfide and calcium tetrasulfide with minor amounts of other materials. In practice, the pentasulfide will predominate. Thus, the average value of X will be about 4 and for convenience in balancing equations the calcium polysulfide will be represented by the formula $CaS_5$. Following this convention, equations (1) and (2) thus may be written as follows:

$$Ca(HS)_2 + 4S \rightleftharpoons CaS_5 + H_2S \qquad (3)$$

$$CaS + 4S \rightleftharpoons CaS_5 \qquad (4)$$

As a practical matter, both of the reversible reactions (3) and (4) normally occur during the sulfur extraction step. One embodiment of the invention is carried out in a manner in which reaction (3) is the predominant reaction, that is, substantial amounts of hydrogen sulfide are produced during the extraction step, and another embodiment of the invention is carried out in which reaction (4) is the predominant reaction. In the latter case, hydrogen sulfide is removed from the leaching solution prior to contact with the sulfur bearing ore.

The sulfur bearing ores processed in accordance with the invention may be ores which occur naturally in the earth's crust or they may be in the nature of man-made sulfur contaminated scrap material. Large amounts of such materials result from industrial processes involving sulfur processing or recovery operations. For example, elemental sulfur recovered by Claus processing of hydrogen sulfide from sour gas is stored in large piles on the ground. In northern regions, which in the winter are subject to extremely low temperatures causing frost heaving of the soil, the sulfur becoming mixed with the soil. When the stockpiled sulfur is removed, the underlying sulfur containing soil remains. Similarly, in the transportation of sulfur, molten sulfur which is loaded on or removed from trains and the like, is often spilled resulting in sulfur scrap material in which the elemental sulfur is mixed with the clay, sand and gravel found in the soil. These and other sulfur contaminated scrap materials may be processed by the present invention similarly as naturally occurring sulfur ores.

In the embodiment illustrated in FIG. 1 of the drawings, an aqueous solution of calcium hydrosulfide (also containing relatively small quantities of calcium polysulfide and calcium monosulfide) is supplied via line 10 to an extraction zone 12. Comminuted sulfur ore ground to a suitable particle size, preferably within the range of 0.1–10 mm., is supplied to the extraction zone via sulfur inlet 14. The extraction zone may take the form of any suitable reaction vessel which can be operated in either a batch-type or continuous-type procedure. Usually it will be preferred to use a continuous reactor, for example, a helical conveyor reactor of the type disclosed in the aforementioned patent to Lewis or a fluidized bed reactor. Alternatively reaction zone 12 might take the form of a plurality of batch type reaction tanks as disclosed in the aforementioned patent to Amono et al. In any event, th aqueous leaching solution is maintained in an intimate lixiviating relationship with the sulfur ore for a suitable extraction time which will depend upon the temperature and pressure within the extraction zone. Typically the extraction time will be within the range of about 30–90 minutes. As indicated by experimental data discussed below near 100% extraction efficiency at reasonable temperature levels can be achieved by maintaining an extraction time of about 50–60 minutes.

The leaching solution may contain a surfactant to reduce the interfacial tension between the water and the ore surfaces. Suitable water-wetting surface active agents for use in the invention include anionic surfactants such as alkyl aryl sulfonates and salts of long chain aliphatic acids and nonionic surfactants such as ethoxylated aliphatic alcohols or alkyl phenols, propoxylated aliphatic alcohols or alkyl phenols and ethoxy-propoxy adducts of aliphatic alcohols and alkyl phenols. Specific anionic surfactants include the alkaline earth metal salts, the alkali metal salts, and the ammonium or substituted ammonium salts of alkyl aryl sulfonates. Suitable nonionic surfactants include the polyethoxylated nonylphenols, which typically will contain over 80% ethylene oxide. Mixtures of surfactants may be employed, including mixtures of anionic and nonanionic surfactants. The concentration of surfactant in the leaching solution should be about 0.01 to 0.1 wt %.

As described later, the spent gangue material is removed from the extraction zone and supplied to a disposal site. Processing of the gangue material may be by any suitable procedure and may involve settling of the spent gangue followed by washing, settling followed by filtration and washing or filtration followed by washing. The loaded leaching solution is withdrawn from the extraction zone via line 16 and passed through a heat exchanger 17 to sulfur production zone 18. Hydrogen sulfide is also withdrawn from the extraction zone via line 20 and supplied to the sulfur production zone where it reacts with the calcium polysulfide in the loaded leaching solution to produce elemental sulfur in calcium hydrosulfide by the reverse of reaction (3) as follows:

$$CaS_5 + H_2S \rightarrow Ca(SH)_2 + 4S \qquad (5)$$

Equation (3) is driven to the right by an increase in temperature. Stated otherwise the amount of sulfur dissolved in the leaching solution varies directly with temperature. The corollary is that the reverse reaction (5) in the sulfur production zone, by which sulfur is recovered from solution, is enhanced by lowering the temperature. Thus, in the preferred embodiment of the invention the extraction zone 12 is operated at a first elevated temperature, preferably within the range of 35°–80° C. and the sulfur production zone is operated at a lower temperature, preferably within the range of 25°–40° C. Reaction (5) is driven toward completion by an increase in pressure. Accordingly, it is preferred to carry out the sulfur extraction step in zone 12 at a lower hydrogen sulfide pressure than the hydrogen sulfide pressure at which the sulfur production step is carried out. Preferably the sulfur extraction step is carried at a hydrogen sulfide pressure of less than one atmosphere. This can be accomplished by the operating zone 12 under a partial vacuum or carrying out the extraction step in the presence of an inert gas such as nitrogen so that the hydrogen sulfide partial pressure is less than one atmosphere even though the total pressure on the reaction 12 is at atmospheric or above.

The output from the sulfur production zone 18 is applied to a separation zone 22 in which the elemental sulfur is recovered from the calcium hydrosulfide solution. Separation zone 22 may be of any type suitable for separation of the precipitated crystalline sulfur from the aqueous solution. Thus, the separation procedure may employ centrifugation or filtration or a combinatijon of these techniques. Typically, the separation procedure will comprise an initial gravity separation step. For example, separation of the elemental sulfur may be accomplished by passing the sulfur suspended in the aqueous medium to a gravity settling tank with the underflow from the gravity settling tank applied to a centrifugal separator such as a cyclone type separator. The solid sulfur extracted from the centrifugal separator is passed for further processing and the overflow from the centrifugal separator is combined with overflow from the gravity settling tank and supplied for recycle to the extraction zone.

As shown in FIG. 1, the stripped calcium hydrosulfide solution from the separation zone 22 is applied via line 23 to a heat exchanger 24. Sulfur is removed from the separation zone via conveyor 25, passed through a washing zone 27 and then supplied via conveyor 29 for further processing. All or part fo the water supplied to the washing zone through line 30 may be withdrawn through line 32 and combined with the stripped solution as makeup water to accommodate losses because of evaporation and the like.

Reagent lost from the solvent solution can be made up by supplying calcium and hydrogen sulfide to the system via line 34. For example, quicklime and/or slaked lime can be added along with hydrogen sulfide to the aqueous solution which is recycled to the extraction zone. Normally, the recycled solution is heated in the heat exchanger 24 to the desired operating temperature of zone 12 and then applied via line 10 to the extraction zone. However, in this embodiment of the invention, heat exchanger 24 is optional and rather than preheating the solvent solution, it can be heated solely within the extraction zone 12.

The gangue from the sulfur ore is recovered from the extraction zone 12 and applied by a conveyor system 36 to a washing zone 38. Wash water is supplied through line 40 to zone 38 to remove any residual calcium hydrosulfide, calcium polysulfide solution from the gangue. All or part of the washings from the gangue material may be supplied for recycled to the extraction zone. For example, wash solution may be withdrawn through line 42 and passed to a concentrator 43. Excess water is removed by line 45 for recycle to the wash tank and concentrated reagent solution is supplied via line 46 to line 10.

Where desirable for enviromental reasons, the residual calcium polysulfide can be readily destroyed by subjecting the washed gangue material to an oxidative environment. Thus, the gangue material may be supplied by conveyor 48 to an oxidation zone 50 where it is contacted with an oxidizing agent such as an aqueous solution of sulfurous acid supplied via line 52. The calcium polysulfide in the gangue will be oxidized as follows:

$$3H_2SO_3 + 2CaS_x \rightarrow 2CaSO_3 + 3H_2O + (2x+1)S \qquad (6)$$

Water is withdrawn through line 54 and the oxidized gangue material containing calcium sulfite and sulfur is passed by conveyor 55 to a suitable dump location. Alternatively, the gangue material from the washing zone can be transported to a dump location where it is layered so that the residual sulfide components can be destroyed by air oxidation.

Under a given set of temperature and pressure conditions, the amount of elemental sulfur solubilized by the aqueous leaching solution will depend upon the amount of sulfided calcium (calcium in the form of calcium monosulfide or calcium hydrosulfide) in the aqueous leaching solution. Typically the sulfided calcium concentration in the leaching solution will range from about 2 wt% up to the solubility limit of about 5 wt%. Preferably the aqueous leaching solution will have a sulfided calcium concentration within the range of 3–4 wt%.

Figure 2:
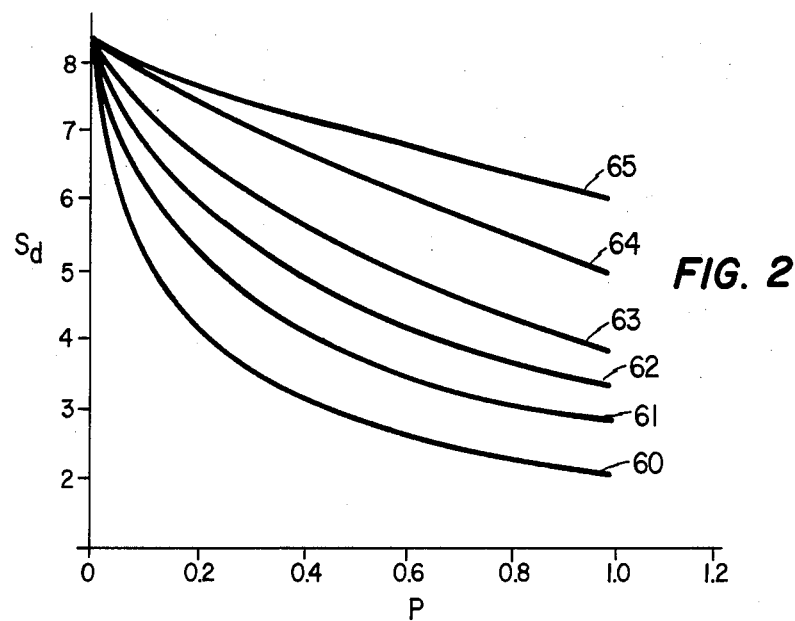

As noted previously, the sulfur extraction reactions (3) and (4) are driven in to the right with increasing temperature whereas reaction (5) leading to the precipitation of elemental sulfur is driven to the right by increasing hydrogen sulfide pressure. For an aqueous solution containing 3% sulfided calcium (corresponding to a clacium hydrosulfide solution of about 8 weight percent) the amount of sulfur dissolved depends upon the temperature and hydrogen sulfide pressure (or partial pressure) in accordance with the following relationship:

$$S_d = \frac{1}{K \times p^{0.716} + 0.119} \qquad (7)$$

wherein:
$S_d$ = the weight percent sulfur dissolved in the aqueous solution,
p = the hydrogen sulfide pressure in atmospheres,
$K = -0.00172T - 4.87/T + 351/T^2 + 0.205$ T = the temperature in degrees C.
FIG. 2 illustrates the relationship between sulfur concentration in the aqueous leaching solution and the hydrogen sulfide pressure vapor pressure of the solution. In FIG. 2, curves 60 through 65, respectively, are graphs of the weight percent sulfur Sd in solution on the ordinate versus the hydrogen sulfide vapor pressure P in atmospheres on the abscissa for temperatures of 30°, 40°, 50°, 60°, 70° and 80° C. As can be seen from an examination of FIG. 2 pressure differentials alone can be relied upon in carrying out the sulfur extraction and sulfur production steps. For example, at 50° C. as indicated by curve 62, reaction zone 12 in FIG. 1 can be operated under a vacuum with a hydrogen sulfide pressure of 0.4 atmospheres to provide a sulfur concentration in the leaching solution of about 5 weight percent. The sulfur production reaction zone 18 can also be operated at 50° C. but at a hydrogen sulfide pressure of one atmosphere to precipitate sulfur to reduce the sulfur concentration in the aqueous solution to about 3.3 weight percent.

While the sulfur recovery process can be carried out with operation of the sulfur extraction and sulfur production zones at about the same temperature, it is preferred to provide a temperature differential of at least 10° C. between the sulfur extraction and production zones. Preferably the temperature differential between the high temperature extraction zone and the lower temperature production zone is within the range of 20°–50° C.

The graphs in FIG. 2 also indicate the substantial advantage resulting from withdrawing the hydrogen sulfide from the aqueous leaching solution under a hydrogen sulfide pressure of less than 1 atmosphere, and desirably less than 0.5 atmosphere. Somewhat lower hydrogen sulfide pressures of about 0.3 atmospheres or less can readily be achieved and it will be preferred to operate at these levels, particularly where the temperature differentials are near the lower end of the aforementioned range, e.g., 10°–30° C., and where the sulfur production step is carried out under ambient temperature conditions, typically about 30° C. or less.

Figure 3:
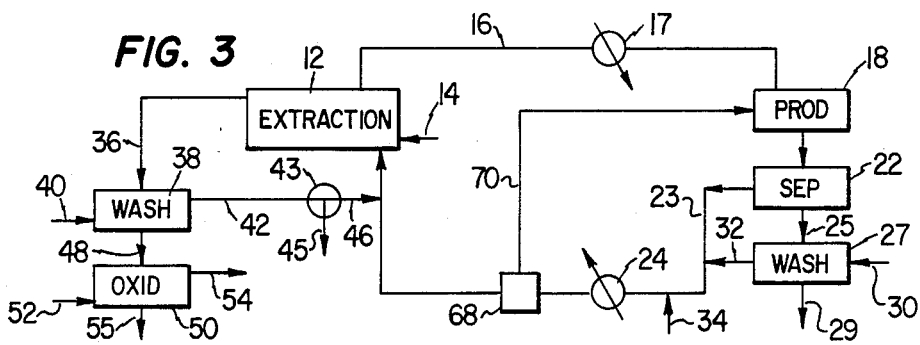
FIG. 3 is a schematic illustration of a flow digram for another embodiment of the invention.

FIG. 3 illustrates another embodiment of the invention in which the predominant sulfur extraction mechanism is indicated by reaction (4). The system depicted in FIG. 3 is identical to the system of FIG. 1 except for the recovery of hydrogen sulfide from the calcium hydrosulfide solution. The regenerated leaching solvent withdrawn from separation zone 22 is passed through heat exchanger 24 to a hydrogen sulfide separation zone 68. Upon heating, the calcium hydrosulfide solution produced by reaction (5) is decomposed to calcium sulfide and hydrogen sulfide in accordance with the following reaction:

$$Ca(SH)_2 \xrightarrow{\Delta} CaS + H_2S \tag{8}$$

The hydrogen sulfide separated from the solution is passed via line 70 to the sulfur production zone 18 where it is employed to precipitate sulfur from the calcium polysulfide solution similarly as described above with respect to the system of FIG. 1. The effluent from separation zone 68 is passed through line 10 to sulfur extraction zone 12 where sulfur is extracted from the ore in accordance with reaction (4). The temperature and pressure parameters are controlled in the system of FIG. 3 similarly as described above with respect to the system of FIG. 1. Thus, the hydrogen sulfide separation step is preferably carried out at a pressure lower than the hydrogen sulfide pressure on the production zone 18. More particularly, the hydrogen sulfide is withdrawn from the aqueous solution in separation zone 68 under a hydrogen sulfide pressure of less than one atmosphere and, preferably, a pressure of less than 0.3 atmospheres as described above. Similarly the solvent extraction step in zone 12 is carried out at an elevated temperature to provide a temperature differential between zones 12 and 18 or at least 10° C. and preferably 20°–50° C. as described above.

A procedure similar to that depicted in FIG. 3 may also be employed in the in situ recovery of sulfur from a sulfur bearing ore. The sulfur deposit may be at the surface or it may be a subterranean deposit. In the latter case, a heated aqueous solution of calcium monosulfide is injected into the subterranean ore zone deposit through suitable injection means. As the heated leaching solution moves through the sulfur bearing zone, sulfur is solubilized in the leaching solution in accordance with reaction (4). The resulting rich solvent is then recovered from the deposit through a suitable production system and passed to a sulfur recovery zone 18 as described above with reference to FIG. 3. Zone 18 is operated at a reduced temperature for the precipitation of sulfur from the calcium polysulfide solution in accordance with reaction (5). The precipitated sulfur is separated and treated as described above. The regenerated aqueous solution of calcium hydrosulfide is heated to drive off hydrogen sulfide (which is employed in the sulfur production step as described above) and the resulting aqueous solution of calcium monosulfide is recirculated to the injection system for use in the in situ leaching process.

Except for the fact that the "gangue" material (the subterranean deposit from which the sulfur is extracted) remains in place, the steps and process parameters described above are also employed in the in situ extraction process. Thus, the injected aqueous solution of calcium monosulfide is heated sufficiently to provide a temperature differential of at least 10° C. and preferably 20°–50° C. between the temperature of the solution injected into the formation and the temperature of the solution in the recovery zone 18. The extraction of the sulfur within the subterranean formation will of necessity occur at an elevated pressure, roughly equivalent to the hydrostatic head of the leaching solution or above, in order to accommodate the injection and production of the leaching solution into and from the subterranean sulfur-bearing formation.

This embodiment of the invention may be employed in the recovery of elemental sulfur from salt-dome deposits of the type which are normally produced by the Frasch process. Such deposits typically take the form of sulfur-bearing limestone formations in which the overburden provides a relatively impermeable cap rock. The limestone formation itself is relatively permeable and the permeability of the formation progressively increases as sulfur is removed. The injection and recovery of the leaching solution can be accomplished utilizing injection and production systems as defined by any suitable arrangement of wells extending from the surface to the subterranean ore deposit. One well arrangement suitable for use in carrying out the invention is a five-spot pattern in which a central injection well is surrounded by four production wells. Other patterns such as seven-spot and nine-spot patterns also may be employed as well as the so-called "line flood" pattern in which injection and production wells are located in generally parallel rows. Typically the spacing between injection and production wells will be on the order of 50 to 200 feet. In some instances, particularly where the subterranean sulfur deposit is of a limited areal extent, injection and production may be carried out through the same well. Thus, in relatively thick sulfur deposits, dually completed injection-production wells of the type disclosed, for example, in U.S. Pat. No. 2,725,106 to Spearow may be employed. Alternatively, injection of fresh leaching solution and withdrawal of loaded leaching solution through the same well may be accomplished by a "huff-and-puff" procedure employing a well system such as disclosed in U.S. Pat. No. 3,708,206 to Hard et al.

Experimental work respecting the invention was carried out on a sulfur ore containing 81.54 wt. percent free sulfur and 18.2 wt. percent gangue material. Extraction runs were conducted out on this ore using a double-wall, water-heated reaction vessel equipped with a hydrogen sulfide sparger, and exhaust vent provided with a pressure controller and a magnetic stirring mechanism. The protocol for the experimental work involved adding a calcium hydrosulfide solution to the reaction vessel, preheating the solution to 70° C., and then adding ground sulfur ore to the reaction vessel. The mixture of leaching solution and ore was then agitated for a designated extraction time, with evolved hydrogen sulfide withdrawn from the vessel through the pressure-regulated exhaust line. At the conclusion of the extraction time, the gangue/leaching solution mixture was removed from the vessel and the gangue separated by filtration. The loaded leaching solution was returned to the vessel. The sulfur recovery procedure was then carried out by decreasing the temperature of the reaction vessel to about 25°–30° C. and sparging hydrogen sulfide into the loaded, extraction solution. The sulfur precipitated from the loaded solution was recovered through filtration and the filtrate also analyzed for its sulfur content in order to arrive at the total amount of sulfur solubilized during the leaching step.

In the experiments reported below the calcium hydrosulfide extraction solution contained 4.05 wt. percent calcium, 7.17 wt. percent divalent sulfur and had a redox potential readout of −627 mv. The ore was mixed with the calcium hydrosulfide solution at a constant weight ratio of solution to ore of 9.54:1. In one set of experiments performed at atmospheric pressure, the extraction procedure was carried out at extraction times of 10, 20, 30, 60 and 90 minutes and a temperature of 70° C. The undissolved gangue material remaining at the end of each test was dried and extracted with carbon disulfide to determine its remaining sulfur content. The percent of sulfur solubilized in the leaching step for the extraction procedure was determined from the sulfur content in the gangue material.

The result of this set of experiments is set forth in Table I in which the first column gives the quantity of calcium hydrosulfide leaching solution in grams, the second column the weight in grams of the ore, the third column the calculated weight of sulfur in the ore, and the fourth column the extraction time in minutes. The amount in grams of gangue material remaining at the conclusion of the extraction phase is set forth in the fifth column, and the quantity of free sulfur in grams remaining in the gangue is given in the sixth column. The seventh column sets forth the weight percent of sulfur dissolved in the filtrate and the last column gives the percent yield of the extraction process calculated on the basis of sulfur remaining in the gangue material.

TABLE I

| Leaching Solution | ORE (gms) | S, (gms) | Extraction time (mins) | Gangue gms | S in gangue (gms) | % S in filtrate | % yield |
|---|---|---|---|---|---|---|---|
| 110.97 | 11.6322 | 9.49 | 90 | 2.23 | 0.100 | 7.81 | 98.9 |
| 114.40 | 11.9920 | 9.78 | 60 | 2.24 | 0.052 | 7.89 | 99.6 |
| 119.25 | 12.5010 | 10.19 | 30 | 2.90 | 0.589 | 7.87 | 94.2 |
| 118.41 | 12.4122 | 10.12 | 20 | 3.38 | 1.115 | 7.09 | 89.0 |
| 115.26 | 12.0821 | 9.85 | 10 | 4.48 | 2.276 | 6.19 | 76.9 |

TABLE II

| | | | | | | | |
|---|---|---|---|---|---|---|---|
| 101.17 | 10.6051 | 8.65 | 20 | 2.88 | 0.945 | 7.09 | 89.1 |
| 102.61 | 10.7565 | 8.77 | 10 | 3.47 | 1.506 | 6.63 | 82.5 |

A second set of experiments on the ore described above was carried out employing a vacuum of about 12 inches of mercury on the reaction vessel during the extraction phase. The test parameters were in all other respects identical to those described above with respect to the experimental work reported in Table I. The results of this set of experiments carried out at extraction times of 10 and 20 minutes are set forth in Table II. As shown in Table II, the reaction provided an initial enhancement in extraction efficiency during the first part of the test. At an extraction time of 20 minutes the yield appeared to be substantially the same as the yield for the test carried out at atmospheric conditions, and runs at longer extraction times thus were not performed.

As noted above, the ratio of extraction solution to ore in these tests was maintained constant at 9.54, producing a weight ratio of extraction solution to free sulfur of about 11.7. Similar experimental work carried out on other sulfur ores and on Frasch sulfur (substantially pure sulfur) indicates that the extraction solution should be used in an amount of about 10–15 parts per part by weight of sulfur to be extracted in order to carry out the process at optimum conditions. Smaller quantities of leaching solution can be used but at a loss in extraction efficiency. There appears to be no advantage in using larger quantities of leaching solution.

Having described specific embodiments of the present invention, it will be understood that modifications thereof may be suggested to those skilled in the art, and it is intended to cover all such modifications as fall within the scope of the appended claims.

We claim:

1. A solvent extraction process for the recovery of sulfur from a free sulfur containing ore, the steps comprising:
   (a) contacting said ore in an extraction zone with an aqueous leaching solution containing a calcium sulfide specie and establishing a lixivating relationship between said ore and said aqueous solution under conditions wherein sulfur from said ore is solubilized into said solution to form calcium polysulfide;
   (b) recovering leaching solution loaded with calcium polysulfide from said extraction zone and passing said loaded solution to a sulfur production zone; and (c) within said sulfur production zone contacting said loaded solution with hydrogen sulfide under conditions to react said hydrogen sulfide with calcium polysulfide in said loaded solution to produce calcium hydrosulfide in said solution and elemental sulfur which precipitates from said solution.

2. The method of claim 1 wherein said ore is contacted with said leaching solution in step (a) at a first higher temperature and said loaded leaching solution is contacted with hydrogen sulfide in step (c) at a second temperature which is lower than said first temperature.

3. The method of claim 1 wherein said aqueous leaching solution contains a surfactant to reduce the interfacial tension between said aqueous solution and said sulfur bearing ore.

4. The method of claim 1 wherein gangue material resulting from leaching of said ore is washed with water and thereafter subjected to an oxidative environment to destroy residual sulfide in said gangue.

5. The method of claim 4 further comprising the step of adding at least a part of the washings from said gangue as a makeup for aqueous leaching solution which is recycled to said extraction zone.

6. The method of claim 2 wherein the temperature differential between the first temperature in said extraction zone and the second temperature in said sulfur production zone is at least 10° C.

7. The method of claim 6 wherein said temperature differential is within the range of 20°–50° C.

8. The method of claim 2 wherein said extraction step is carried out at a temperature within the range of 35°–80° C. and said sulfur production step is carried out at a temperature which is lower than that of the extraction step wherein said lower temperature is in the range of 25°–40° C.

9. The method of claim 1 wherein said aqueous leaching solution has a sulfided calcium concentration within the range of 2–5 weight percent.

10. The method of claim 2 further comprising the step of heating the aqueous solution of calcium hydrosulfide produced in step (c) to convert at least a substantial portion of said calcium hydrosulfide to calcium monosulfide with the production of hydrogen sulfide, removing hydrogen sulfide from said aqueous solution of calcium monosulfide and recycling said aqueous solution of calcium monosulfide for use in step (a).

11. The method of claim 10 wherein said hydrogen sulfide is withdrawn from said aqueous solution under a hydrogen sulfide pressure which is less than the hydrogen sulfide pressure in said sulfur production zone.

12. The method of claim 11 wherein said hydrogen sulfide is withdrawn from said aqueous solution under a hydrogen sulfide pressure of less than 1 atmosphere.

13. The method of claim 10 wherein hydrogen sulfide removed from said aqueous solution of calcium monosulfide is recycled to said sulfur production zone for use in step (c).

14. The method of claim 2 wherein the contact time between said solution and said ore in step (a) is within the range of 30–90 minutes.

15. The method of claim 2 wherein the weight ratio of said leaching solution to the sulfur in said ore in step (a) is within the range of 10–15.

16. A solvent extraction process for the recovery of sulfur from a free sulfur containing ore, the steps comprising:

(a) contacting said ore in an extraction zone with an aqueous leaching solution of calcium hydrosulfide and establishing a lixivating relationship between said ore and said aqueous solution under conditions wherein sulfur from said ore is solubilized into said solution to form calcium polysulfide with the production of hydrogen sulfide;

(b) withdrawing hydrogen sulfide from said extraction zone;

(c) recovering leaching solution loaded with calcium polysulfide from said extraction zone and passing said loaded solution to a sulfur production zone; and (d) within said sulfur production zone contacting said loaded solution with hydrogen sulfide under conditions at which said hydrogen sulfide reacts with calcium polysulfide in said loaded solution to produce elemental sulfur and calcium hydrosulfide.

17. The method of claim 16 wherein said ore is contacted with said leaching solution in step (a) at a first higher temperature and said loaded leaching solution is contacted with hydrogen sulfide in step (d) at a second temperature which is lower than said first temperature.

18. The method of claim 16 wherein the aqueous solution of calcium hydrosulfide produced in step (d) is recycled to said extraction zone for use in step (a).

19. The method of claim 18 wherein hydrogen sulfide withdrawn from said extraction zone is passed to said sulfur production zone for use in step (d).

20. The method of claim 16 wherein gangue material resulting from leaching of said ore is washed with water and thereafter subjected to an oxidative environment to destroy residual sulfide in said gangue.

21. The method of claim 20 further comprising the step of adding at least a part of the washings from said gangue to a makeup solution of calcium hydrosulfide which is recycled to said extraction zone.

22. The method of claim 17 wherein the temperature differential between the first temperature in said extraction zone and the second temperature in said sulfur production zone is at least 10° C.

23. The method of claim 22 wherein said temperature differential is within the range of 20°–50° C.

24. The method of claim 22 wherein said extraction step is carried out at a temperature within the range of 35°–80° C. and said sulfur production step is carried out at a temperature which is lower than that of the extraction step wherein said lower temperature is in the range of 25°–40° C.

25. The method of claim 16 wherein said extraction step is carried out under a hydrogen sulfide pressure which is less than the hydrogen sulfide pressure at which said sulfur production step is carried out.

26. The method of claim 25 wherein said sulfur extraction step is carried out at a hydrogen sulfide pressure of less than 1 atmosphere.

27. The method of claim 25 wherein said sulfur extraction step is carried out at a hydrogen sulfide pressure of less than 0.3 atmosphere.

28. The method of claim 16 wherein said aqueous solution of calcium hydrosulfide has a calcium hydrosulfide concentration within the range of 2–5 weight percent.

* * * * *

UNITED STATES PATENT AND TRADEMARK OFFICE
CERTIFICATE OF CORRECTION

PATENT NO. : 4,722,832

DATED : February 2, 1988

INVENTOR(S) : Weston et al.

It is certified that error appears in the above-identified patent and that said Letters Patent is hereby corrected as shown below:

Col. 3, lines 11-12, change "of one" to --for one--.

Col. 3, line 16, change "digram" to --diagram--.

Col. 4, line 28, change "th" to --the--.

Col. 4, line 56, change "0.01 to 0.1 wt %" to --0.01 to 0.2 wt %--.

Col. 5, line 36, change "combinatijon" to --combination--.

Col. 5, line 54, change "fo" to --of--.

Col. 6, line 51, change "clacium" to --calcium--.

Signed and Sealed this

Tenth Day of December, 1991

Attest:

HARRY F. MANBECK, JR.

*Attesting Officer*     *Commissioner of Patents and Trademarks*